United States Patent
Maria

(10) Patent No.: US 10,419,397 B2
(45) Date of Patent: Sep. 17, 2019

(54) BEHAVIOR-BASED FILTERS FOR SIGNALING SYSTEM NUMBER 7 NETWORKS

(71) Applicant: AT&T Mobility II LLC, Atlanta, GA (US)

(72) Inventor: Arturo Maria, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 16/010,730

(22) Filed: Jun. 18, 2018

(65) Prior Publication Data

US 2018/0302374 A1    Oct. 18, 2018

Related U.S. Application Data

(63) Continuation of application No. 15/049,032, filed on Feb. 20, 2016, now Pat. No. 10,003,573.

(51) Int. Cl.
H04L 29/06    (2006.01)

(52) U.S. Cl.
CPC ...... H04L 63/0227 (2013.01); H04L 63/0209 (2013.01)

(58) Field of Classification Search
None
See application file for complete search history.

(56) References Cited

U.S. PATENT DOCUMENTS

| 5,799,317 | A | 8/1998 | He et al. |
| 6,308,276 | B1 | 10/2001 | Ashdown et al. |
| 6,359,976 | B1 * | 3/2002 | Kalyanpur ............ H04M 15/00 379/111 |
| 6,363,411 | B1 * | 3/2002 | Dugan .............. H04M 3/42136 379/201.01 |

(Continued)

OTHER PUBLICATIONS

Chana, A.; Takawira, F. An Examination of Signaling Traffic in a Super-Charged Mobile Network. 2003 IEEE Wireless Communications and Networking. WCNC 2003. https://ieeexplore.ieee.org/stamp/stamp.jsp?tp=&arnumber=1200521 (Year: 2003).*

(Continued)

Primary Examiner — Jeremiah L Avery
(74) Attorney, Agent, or Firm — Hartman & Citrin LLC

(57) ABSTRACT

Concepts and technologies disclosed herein are directed to behavior-based filters for signaling system number 7 ("SS7") networks. According to one embodiment disclosed herein, a behavior-based SS7 filter executed by a processor can receive SS7 traffic. The behavior-based SS7 filter can determine a behavioral characteristic from the SS7 traffic and can compare a behavior of the SS7 traffic, based upon the behavior characteristic, to a behavior profile. The behavior-based SS7 filter also can determine whether the behavior of the SS7 traffic fits within a tolerance threshold of the behavior profile. If the SS7 traffic fits within the tolerance threshold, the behavior-based SS7 filter can instruct a signal transfer point ("STP") to which the SS7 traffic is directed to allow routing of the SS7 traffic. If, however, the SS7 traffic (Continued)

does not fit within the tolerance threshold, the behavior-based SS7 filter can instruct the STP to deny routing of the SS7 traffic.

20 Claims, 8 Drawing Sheets

(56) References Cited

U.S. PATENT DOCUMENTS

| | | | |
|---|---|---|---|
| 7,075,918 B1* | 7/2006 | Kung | H04M 3/42323 370/352 |
| 7,082,121 B1 | 7/2006 | Stammers et al. | |
| 7,133,519 B2 | 11/2006 | Ashdown et al. | |
| 7,240,364 B1* | 7/2007 | Branscomb | H04L 29/12113 726/5 |
| 7,360,090 B1 | 4/2008 | Doskow et al. | |
| 7,515,607 B2 | 4/2009 | Angermayr et al. | |
| 7,564,870 B2 | 7/2009 | Miller et al. | |
| 7,853,784 B2 | 12/2010 | Allison et al. | |
| 7,889,677 B1 | 2/2011 | Foldvik | |
| 8,224,928 B2 | 7/2012 | Brendes et al. | |
| 8,239,932 B2 | 8/2012 | Maria | |
| 8,413,228 B2 | 4/2013 | Maria | |
| 8,505,087 B2 | 8/2013 | Maria | |
| 9,167,471 B2 | 10/2015 | Collins et al. | |
| 9,485,604 B2* | 11/2016 | Yang | H04W 4/70 |
| 2002/0188486 A1* | 12/2002 | Gil | G06Q 10/06 705/7.12 |
| 2004/0198386 A1* | 10/2004 | Dupray | H04W 64/00 455/456.1 |
| 2005/0047434 A1 | 3/2005 | Hopkins | |
| 2006/0002403 A1* | 1/2006 | Bettis | H04L 12/66 370/401 |
| 2006/0013200 A1* | 1/2006 | Bettis | H04M 3/12 370/352 |
| 2006/0161626 A1* | 7/2006 | Cardina | H04W 4/12 709/206 |
| 2007/0032225 A1* | 2/2007 | Konicek | H04M 1/72513 455/417 |
| 2007/0094712 A1* | 4/2007 | Gibbs | H04L 41/0893 726/3 |
| 2009/0061854 A1* | 3/2009 | Gillot | H04W 24/00 455/432.1 |

OTHER PUBLICATIONS

Sengar, Hemant et al. SS7 Over IP: Signaling Interworking Vulnerabilities. IEEE Network, vol. 20, Issue: 6. https://ieeexplore.ieee.org/stamp/stamp.jsp?tp=&arnumber=4050028 (Year: 2006).*

Skoog, R.A. et al. Network Management and Control Mechanisms to Prevent Maliciously Induced Network Instability. NOMS 2002. IEEE/IFIP Network Operations and Management Symposium. https://ieeexplore.ieee.org/stamp/stamp.jsp?tp=&arnumber=1015593 (Year: 2002).* de Marca, J. Roberto B.; de Carvalho, Rodrigo C. D. Effect of Signaling Network Topology in Cellular System Performance. The 57th IEEE Semiannual Vehicular Technology Conference, 2003. https://ieeexplore.ieee.org/stamp/stamp.jsp?tp=&arnumber=1208896 (Year: 2003).*

Rocha, Eduardo; Salvador, Paulo; Nogueira, Antonio, "Detection of Illicit Traffic based on Multiscale Analysis," 17th International Conference on Software, Telecommunications & Computer Networks, SoftCOM 2009, Pub. Date: 2009, http://ieeexplore.ieee.org/stamp/stamp.jsp?tp=&arnumber=5306872.

Abidin, H. Z.; Fisal, N.; Ansari, M.S., "An Efficient CAC Scheme for IP Traffic over Wireless ATM Networks," The 9th Asia-Pacific Conference on Communications, 2003, APCC 2003, Pub. Date: 2003, http://ieeexplore.ieee.org/stamp/stamp.jsp?tp=&arnumber=1274419.

Mai, Tang V.; Molnar, Joseph A.; Rudd, Dr. Kevin, "Security Vulnerabilities in Physical Layer of Cognitive Radio," 2011 IEEE 54th International Midwest Symposium on Circuits and Systems (MWSCAS), Pub. Date: 2011, http://ieeexplore.ieee.org/stamp/stamp.jsp?tp=&arnumber=6026500.

Morawski, Michal; Ignaciuk, Przemyslaw, "Traffic Control Under Scarce Resources in Wireless Networks—A Game-Based Approach," 2015 19th International Conference on System Theory, Control and Computing (ICSTCC), Pub. Date: 2015, http://ieeexplore.ieee.org/stamp/stamp.jsp?tp=&arnu mber=7321309.

U.S. Office Action dated Sep. 20, 2017 in U.S. Appl. No. 15/049,032.
U.S. Notice of Allowance dated Feb. 9, 2018 in U.S. Appl. No. 15/049,032.

* cited by examiner

BEHAVIOR-BASED FILTERS FOR SIGNALING SYSTEM NUMBER 7 NETWORKS

CROSS-REFERENCE TO RELATED APPLICATIONS

This application is a continuation of U.S. patent application Ser. No. 15/049,032, entitled "Behavior-Based Filters for Signaling System Number 7 Networks," filed Feb. 20, 2016, now U.S. Pat. No. 10,003,573, which is incorporated herein by reference in its entirety.

BACKGROUND

Signaling System Number 7 ("SS7") is a common channel signaling system whereby signaling links, separate from the voice path, are used to transfer messages between switches or other nodes to set up voice trunks or access to databases. The SS7 protocol consists of a layered structure with each layer routing specific functions. Levels 1, 2, and 3 make up the Message Transfer Part ("MTP") that provides functions for the reliable transfer of signaling messages. Level 1, the physical layer, includes the physical and electrical portion of the link and access protocol. Level 2, the data link layer, includes error detection and correction, sequence control, message delimitation using flags and link failure detection functions. Level 3, the network layer, includes message handling and network management functions. All signaling points must have the capability to properly respond to network management controls, such as transfer controlled, transfer prohibited, and the like.

The major components of an SS7 network are referred to as signaling points, including signal switching points ("SSPs"), signal transfer points ("STPs"), and signal control points ("SCPs"). SSPs are switches (e.g., end office or tandems) equipped with SS7-capable software and terminating signaling links. SSPs originate, terminate, or switch calls. STPs are routers that operate in carrier-based SS7 networks. STPs route traffic among various elements in the carrier network that use the SS7 network protocol. SCPs are databases that provide information for advanced call-processing capabilities.

In order to protect SS7 networks, vendors and carriers have implemented SS7-based firewalls that screen SS7 signaling traffic and work in tandem with STPs in order to either allow or deny routing/access to SS7 network elements based on a pre-defined set of rules. These rules include source/destination, user authentication, and other SS7 parameters. If a malicious actor figures out a way to bypass the pre-determined set of rules, then access to SS7 networks and network elements is compromised.

SUMMARY

Concepts and technologies disclosed herein are directed to behavior-based filters for SS7 networks. The concepts and technologies described herein provide a better way to dynamically detect the pattern of behavior of past users, network elements, and STPs that manage the SS7 networks. If a behavior pattern fits pre-established or anticipated behavior, then access is allowed. If a behavior pattern does not fit a pre-established or anticipated behavior, then access is denied. This approach either highly compliments existing SS7 firewalls or reduces the need for SS7 firewalls since the function can be implemented in STPs throughout the network as part of a network function.

According to one embodiment of the concepts and technologies disclosed herein, a behavior-based SS7 filter executed by a processor can receive SS7 traffic. The behavior-based SS7 filter can determine a behavioral characteristic from the SS7 traffic and can compare a behavior of the SS7 traffic, based upon the behavior characteristic, to a behavior profile. The behavior-based SS7 filter also can determine whether the behavior of the SS7 traffic fits within a tolerance threshold of the behavior profile. If the SS7 traffic fits within the tolerance threshold, the behavior-based SS7 filter can instruct a signal transfer point ("STP") to which the SS7 traffic is directed to allow routing of the SS7 traffic. If, however, the SS7 traffic does not fit within the tolerance threshold, the behavior-based SS7 filter can instruct the STP to deny routing of the SS7 traffic.

In some embodiments, the behavior-based SS7 filter can utilize past SS7 traffic to create the behavior profile. The behavior-based SS7 filter can store the behavior profile in a behavior database.

In some embodiments, the SS7 traffic is directed to an STP that is associated with an STP front end processor ("STP-FEP"). In these embodiments, the processor that executes the behavior-based SS7 filter is included in the STP-FEP.

In some embodiments, the SS7 traffic is directed to an STP that is in communication with a software-defined network ("SDN") that includes a virtualized network function ("VNF") executing on a network functions virtualization platform ("NFVP"). In these embodiments, the processor that executes the behavior-based SS7 filter is included in the NFVP.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The concepts and technologies disclosed herein are directed to behavior-based filters for SS7 networks. The concepts and technologies disclosed herein provide a set of filters that reside in SS7 networks, and in particular, within STPs. The filters can be implemented as either hardware processors in the form of front end processors ("FEP") or software-defined network ("SDN") elements. In the case of SDN implementation, the filters can be provided as virtualized network functions ("VNFs") operating within a network functions virtualization platform ("NFVP"). The purpose of the filters is to capture SS7 traffic, analyze behavior, and authenticate certain functions based on previous/past behavioral characteristics.

SS7 firewalls have been implemented and are in place in carrier environments today. These firewalls rely on a certain set of pre-defined rules to allow or deny traffic flowing into SS7 networks. The concepts and technologies disclosed herein provide a new and nonobvious approach to allow or deny traffic flowing into SS7 networks. Rather than using a pre-defined set of rules, behavior-based filters capture a pattern of usage associated with individual subscribers, store that pattern of usage, and dynamically compare SS7 traffic on a real-time basis with pre-established behavior. If the behavior falls within tolerance levels, then access to SS7 elements via STPs is allowed. Behavior-based filters eliminate or at least decrease the needs for established SS7 firewalls and current authentication methods.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Figure 1:
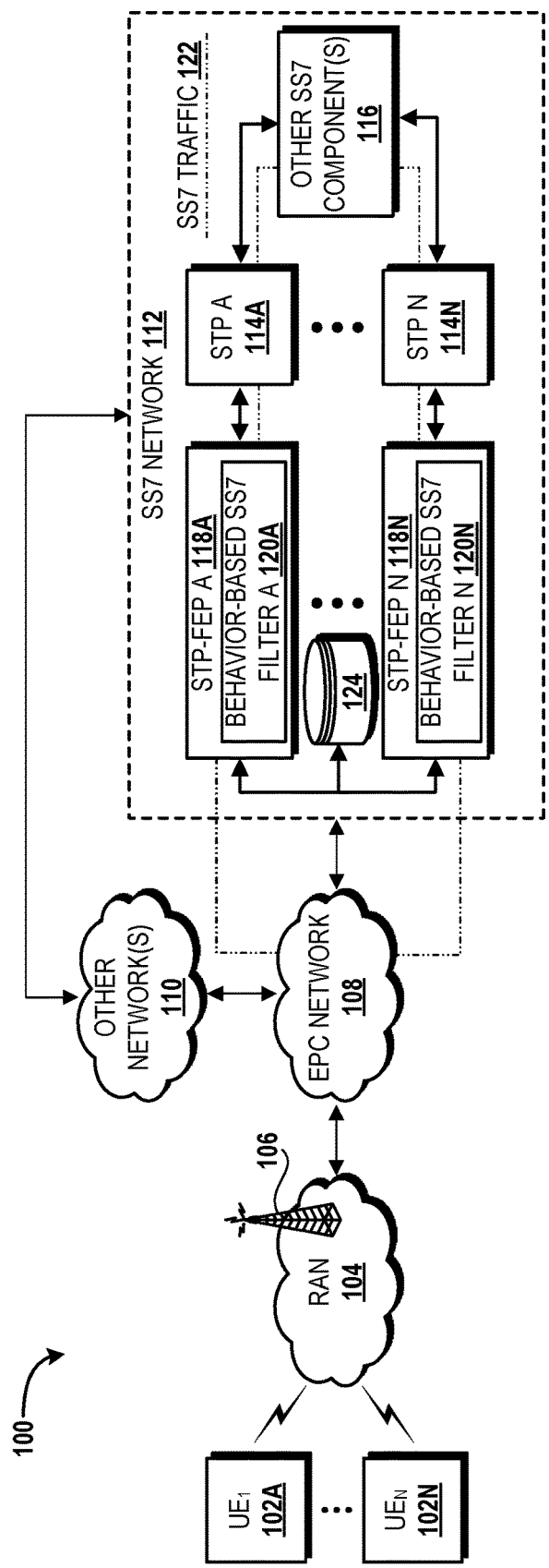
FIG. 1 is a block diagram illustrating an operating environment in which aspects of the concepts and technologies disclosed herein can be implemented.

Turning now to FIG. 1, a block diagram illustrating an operating environment 100 in which aspects of the concepts and technologies disclosed herein can be implemented. The operating environment 100 includes a plurality of user equipment devices ("UEs") 102A-102N (referred to herein collectively as UEs 102, or in the singular form as UE 102) operating in communication with a radio access network ("RAN") 104. Each of the UEs 102 can be a cellular phone, a feature phone, a smartphone, a mobile computing device, a tablet computing device, a portable television, a portable video game console, or the like capable of communicating with the RAN 104. The UEs 102 can communicate with the RAN 104 by way of one or more eNodeBs ("eNBs"), such as an eNB 106. Although only a single eNB 106 is shown, the RAN 104 can support multiple eNBs configured the same as or similar to the eNB 106.

The RAN 104 can include one or more service areas ("cells") having the same or different cell sizes, which may be represented by different cell-types. As used herein, a "cell" refers to a geographical area that is served by one or more base stations operating within an access network. The cells within the RAN 104 can include the same or different cell sizes, which may be represented by different cell-types. A cell-type can be associated with certain dimensional characteristics that define the effective radio range of a cell. Cell-types can include, but are not limited to, a macro cell-type, a metro cell-type, a femto cell-type, a pico cell-type, a micro cell-type, wireless local area network ("WLAN") cell-type, and a white space network cell-type. For ease of explanation, a "small cell" cell-type is utilized herein to collectively refer to a group of cell-types that includes femto cell-type, pico cell-type, and micro cell-type, in general contrast to a macro cell-type, which offers a larger coverage area. Other cell-types, including proprietary cell-types and temporary cell-types are also contemplated. Although in the illustrated example, the UEs 102 are shown as being in communication with one RAN (i.e., the RAN 104), the UEs 102 may be in communication with any number of access networks, including networks that incorporate collocated wireless wide area network ("WWAN") WI-FI and cellular technologies, and as such, the UEs 102 can be dual-mode devices.

The RAN 104 can operate in accordance with one or more radio access technologies ("RAT") that utilize mobile telecommunications standards including, but not limited to, Global System for Mobile communications ("GSM"), Code Division Multiple Access ("CDMA") ONE, CDMA2000, Universal Mobile Telecommunications System ("UMTS"), LTE, Worldwide Interoperability for Microwave Access ("WiMAX"), other current 3GPP cellular technologies, other future 3GPP cellular technologies, combinations thereof, and/or the like. The RAN 104 can utilize various channel access methods (which may or may not be used by the aforementioned standards), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like to provide a radio/air interface to the UEs 102. Data communications can be provided in part by the RAN 104 using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, the RAN 104 may be a GSM RAN ("GRAN"), a GSM EDGE RAN ("GERAN"), a UMTS Terrestrial Radio Access Network ("UTRAN"), an evolved U-TRAN ("E-UTRAN"), any combination thereof, and/or the like. The concepts and technologies disclosed herein will be described in context of the RAN 104 operating in accordance with LTE, although those skilled in the art will appreciate the applicability of the concepts and technologies disclosed herein to other cellular technologies, including, in particular, those captured within future generation 3GPP standards. Moreover, in some embodiments, the RAN 104 is or includes one or more virtual RANs ("vRANs").

As used herein, a "base station" refers to a radio receiver and/or transmitter (collectively, transceiver) that is/are configured to provide a radio/air interface over which one or more of the UEs 102 can connect to a network. Accordingly, a base station is intended to encompass one or more base transceiver stations ("BTSs"), one or more NBs, one or more eNBs (e.g., the eNB 106), one or more home eNBs, one or more wireless access points ("APs"), one or more multi-standard metro cell ("MSMC") nodes, and/or other networking nodes or combinations thereof that are capable of providing a radio/air interface regardless of the technologies utilized to do so. A base station can be in communication with one or more antennas (not shown), each of which may be configured in accordance with any antenna design specifications to provide a physical interface for receiving and transmitting radio waves to and from one or more devices, such as the UEs 102.

The RAN 104 is shown as being in communication with an evolved packet core ("EPC") network 108. The EPC network 108 provides core network functions in accordance with Third Generation Partnership Project ("3GPP") standards specifications. Accordingly, the EPC network 108 can include one or more mobility management entity ("MMEs"), one or more serving gateways ("SGWs"), one or more packet data network gateways ("PGWs"), one or more combination SGW/PGWs, one or more home subscriber servers ("HSSs"), one or more policy and charging rules functions ("PCRFs"), one or more DIAMETER routing agents ("DRAs"), one or more DIAMETER edge agents ("DEAs"), or any combination thereof.

An MME operating within the EPC network 108 can be configured in accordance with 3GPP standards specifications. An MME, in general, can perform operations to control signaling traffic related to mobility and security for access to the RAN 104.

An SGW can be configured in accordance with 3GPP standards specifications. An SGW provides a point of interconnect between the radio-side (e.g., the RAN 104) and the EPC network 108. An SGW serves the UEs 102 by routing incoming and outgoing IP packets. A PGW can be configured in accordance with 3GPP standards specifications. A PGW interconnects the EPC network 108 and one or more external IP networks, such as, in the illustrated embodiment, one or more other networks 110. The other network(s) 110 can include other public land mobile networks ("PLMNs"), PDNs, circuit-switched networks, and the like.

A PGW routes IP packets to and from the other network(s) 110. A PGW also performs operations such as IP address/IP prefix allocation, policy control, and charging. In some implementations, a PGW and an SGW are deployed as independent network components, and in other implementations as a combined network component offering functionality of both a PGW and an SGW.

An HSS can be configured in accordance with 3GPP standards specifications. An HSS is a database that contains user-related information for users of devices, such as the UEs 102. An HSS can provide support functions to one or more MMEs for mobility management, call and session setup, user authentication, and access authorization.

A PCRF can be configured in accordance with 3GPP standards specifications. A PCRF can determine policy rules, detect service data flows, enforce policies, and perform flow-based charging.

A DRA can be configured in accordance with 3GPP standards specifications. A DRA is a functional element in a 3G or 4G (e.g., LTE) network that provides real-time routing capabilities to ensure that messages are routed among the correct elements within a network. DRAs were introduced by the 3GPP to address the increased DIAMETER signaling traffic and growing complexity of 4G LTE networks. A DRA can provide real-time routing capabilities to ensure that DIAMETER signaling messages are routed to the correct resources in the EPC network 108.

A DEA can be configured in accordance with 3GPP standards specifications. A DEA provides a point of contact into and out of the EPC core network 108 at the DIAMETER application level. A DEA provides secure communications to connect the EPC network 108 to the other network(s) 110 to facilitate internetwork signaling operations (e.g., roaming, charging, and billing), for example, between home and visited PLMN. A DEA can enable DIAMETER signaling traffic to flow core networks while also disguising the topology of the core networks to one another.

The EPC network 108 is illustrated as being in communication with an SS7 network 112. The SS7 network 112 can be configured in accordance with 3GPP standards specifications. The SS7 network 112 can operate utilizing SS7 protocol, which provides a common channel signaling system whereby signaling links, separate from the voice path, are used to transfer messages between switches or other nodes to setup voice trunks or access to databases. The SS7 protocol consists of a layered structure with each layer routing specific functions. Levels 1, 2, and 3 make up the MTP that provides functions for the reliable transfer of signaling messages. Level 1, the physical layer, includes the physical and electrical portion of the link and access protocol. Level 2, the data link layer, includes error detection and correction, sequence control, message delimitation using flags and link failure detection functions. Level 3, the network layer, includes message handling and network management functions. All signaling points must have the capability to properly respond to network management controls, such as transfer controlled, transfer prohibited, and the like.

The major components of an SS7 network are referred to as signaling points, including SSPs, STPs, and SCPs. SSPs are switches (e.g., end office or tandems) equipped with SS7-capable software and terminating signaling links. SSPs originate, terminate, or switch calls. STPs are routers that operate in carrier-based SS7 networks. STPs route traffic among various elements in the carrier network that use the SS7 network protocol. SCPs are databases that provide information for advanced call-processing capabilities.

The illustrated SS7 network 112 includes a plurality of STPs 114A-114N (referred to herein collectively as STPs 114, or in the singular form as STP 114). The STPs 114 are operating in communication with one or more other SS7 components 116, which can include, for example, one or more SSPs, one or more SCPs, or some combination thereof. Also, each of the STPs 114A-114N is associated with a respective STP front end processor ("STP-FEP") 118A-118N (referred to herein collectively as STP-FEPs 118, or in the singular form as STP-FEP 118).

Each of the STP-FEPs 118 is associated with, and serves as a front end for, one or more of the STPs 114A-114N. In the illustrated example, the STP-FEP A 118A is associated with, and serves as a front end for, the STP A 114A, and similarly, the STP-FEP N 118N is associated with, and serves as a front end for, the STP N 114N. Each of the STP-FEPs 118 is made addressable via the point code (i.e., network address) associated with the corresponding one of the STPs 114. In this manner, each of the STP-FEPs 118 appears to the other SS7 components 116 of the SS7 network 112 as the corresponding STP 114.

Each of the STP-FEPs 118A-118N includes a behavior-based SS7 filter 120A-120N (referred to herein collectively as behavior-based SS7 filters 120, or in the singular form as behavior-based SS7 filter 120). The behavior-based SS7 filters 120 can, in some embodiments, be implemented as dedicated hardware processors. The behavior-based SS7 filters 120 can capture SS7 traffic 122, analyze behavior associated with the SS7 traffic 122, and authenticate SS7 functions based on past behavioral characteristics, which can be stored in a behavior database 124, as part of one or more behavior profiles. Each behavior profile can be associated with a tolerance threshold. A tolerance threshold identifies a maximum tolerance level to be utilized by the behavior-based SS7 filter 120 to determine whether SS7 traffic 122 fits a behavior profile. If the SS7 traffic 122 exhibits behavior that fits within the tolerance threshold, then the behavior-based SS7 filter 120 can instruct the STP 114 to allow routing of the SS7 traffic 122. If not, the behavior-based SS7 filter 120 can instruct the STP 114 to deny routing of the SS7 traffic 122.

An example implementation of behavioral characteristics that can make up, at least in part, a behavior profile, will now be described. A carrier (e.g., in Australia), might notice thousands of requests to validate/authenticate a home location register profile. Under normal circumstances this would be acceptable, but in this example, the requests originate from another carrier operating outside of Australia (e.g., in Europe), and for this reason, the behavior might be flagged as potentially malicious. Carriers worldwide might use authentication requests across the world to determine the validity of users even when not roaming, for purposes such as to gather subscriber intelligence and add to their big data repositories. SS7 authentication was never designed for such purposes and as such can indicate unwanted behavior. SS7 authentication was implemented for roaming purposes in order to cut fraud losses not to gather marketing/subscriber intelligence. The maximum tolerance level associated therewith can be set to the maximum level of a normal range (e.g., requests associated with legitimate activity such for roaming authentication such that values over that level indicate possible unwanted behavior. Other potential threats are terrorist's organizations and/or intelligence gathering national assets authenticating users just to find out if they are valid.

In order to protect SS7 networks, vendors and carriers have implemented SS7-based firewalls that screen SS7 signaling traffic and work in tandem with STPs in order to either allow or deny routing/access to SS7 network elements based on a pre-defined set of rules. These rules include source/destination, user authentication, and other SS7 parameters. A challenge with this approach is that a pre-defined set of rules needs to be established. If a malicious actor figures out a way to bypass the pre-determined set of rules, then access to SS7 networks and network elements is compromised. The behavior-based SS7 filters 120 provide a new approach. That is, rather than using a pre-defined set of rules, the behavior-based SS7 filters 120 capture a pattern of SS7 signaling usage associated with individual subscribers (e.g., users associated with the UEs 102), store that pattern of usage in the behavior database 124, and dynamically compare the SS7 traffic 122 in real-time with pre-established behavior. If the behavior falls within tolerance levels (i.e., below a predetermined tolerance threshold), then access to the other SS7 components 116 via one or more of the STPs 114 is allowed. Moreover, the behavior-based SS7 filters 120 eliminate, or at least decrease, the need to deploy SS7 firewalls and to utilize current authentication methods. Additional details regarding how the behavior-based SS7 filters 120 establish behavior characteristics from the SS7 traffic 122 will be provided herein below with reference to FIG. 3. Additional details regarding how the behavior-based SS7 filters 120 filter the SS7 traffic 122 based upon the behavior characteristics will be provided herein below with reference to FIG. 4.

Figure 2:
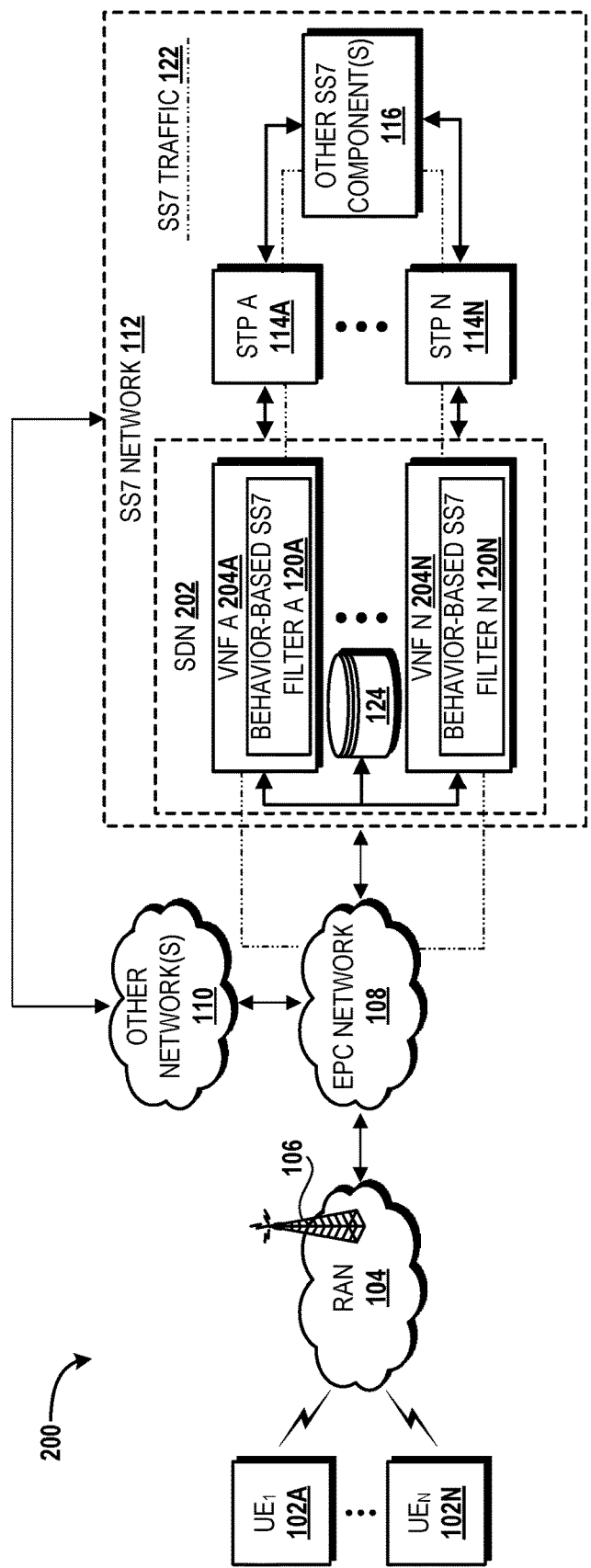
FIG. 2 is a block diagram illustrating another operating environment in which aspects of the concepts and technologies disclosed herein can be implemented.

Turning now to FIG. 2, a block diagram illustrating another operating environment 200 in which aspects of the concepts and technologies disclosed herein can be implemented. The operating environment 200 includes the UEs 102 operating in communication with the RAN 104, which in turn, is in communication with the EPC network 108 that facilitates communication to/from the other network(s) 110 and the SS7 network 112 (all shown in FIG. 1).

The illustrated SS7 network 112 includes the plurality of STPs 114. The STPs 114 are operating in communication with the other SS7 component(s) 116. In FIG. 2, the STPs 114 are provided without the front end implemented via the STP-FEPs 118 that contain the behavior-based SS7 filters 120. Instead, the embodiment illustrated in FIG. 2 provides the behavior-based SS7 filters 120 via an SDN 202, and more particularly, via a plurality of VNFs 204A-204N (referred to herein collectively as VNFs 204, or in the singular form as VNF 204). The VNFs 204 operate on a common set of hardware resources, including, for example, compute resources, memory resources, input/output resources, storage resources, and the like. The behavior-based SS7 filters 120 can capture SS7 traffic 122, analyze behavior associated with the SS7 traffic 122, and authenticate SS7 functions based on past behavioral characteristics, which can be stored in the behavior database 124. The behavior-based SS7 filters 120 can, in these embodiments, be implemented in a NFVP architecture such as described herein below with reference to FIG. 7.

Figure 3:
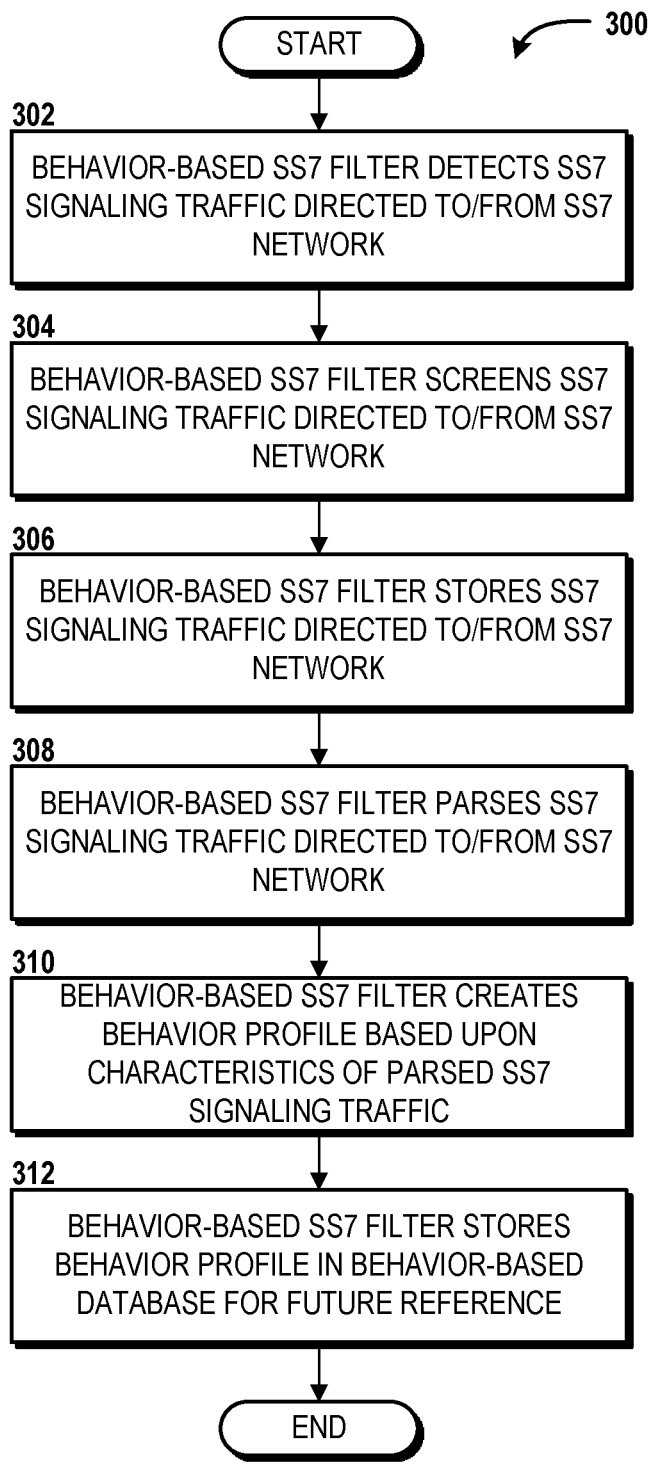
FIG. 3 is a flow diagram illustrating aspects of a method for behavior-based filtering of SS7 traffic, according to an illustrative embodiment.

Turning now to FIG. 3, a flow diagram illustrating aspects of a method 300 for behavior-based filtering of SS7 traffic will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors disclosed herein to perform operations.

For purposes of illustrating and describing some of the concepts of the present disclosure, the method 300 is described as being performed, at least in part, by the behavior-based SS7 filter 120 implemented in the STP-FEP 118, such as in the embodiment illustrated in FIG. 1, or by the behavior-based SS7 filter 120 implemented in the VNF 204, such as in the embodiment illustrated in FIG. 2. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 300 begins at operation 302, where the behavior-based SS7 filter 120 detects SS7 signaling traffic ("SS7 traffic 122") directed to/from the SS7 network 112. In particular, the behavior-based SS7 filter 120 can detect MTP messages, ISDN user part ("ISUP") messages, signaling connection control part ("SCCP") messages, transaction capabilities application part ("TCAP") messages, or some combination thereof. In some embodiments, TCAP messages might be of particular interest to the behavior-based SS7 filter 120.

From operation 302, the method 300 proceeds to operation 304, where the behavior-based SS7 filter 120 screens the SS7 traffic 122. In particular, the behavior-based SS7 filter 120 can screen the SS7 traffic 122 for particular SS7 requests, TCAP messages, and/or other relevant messages. The behavior-based SS7 filter 120 can be configured to flag certain message types that are useful in establishing behavior profiles. An example of this would be an inordinate or very large number of authentication requests from foreign carriers when in fact those users are not roaming. The behavior-based SS7 filter 120 can keep track of these requests and store them in an intelligent repository for future behavior reference. For example, if a carrier in Germany usually averages about 500 authentication requests per day to another carrier in Australia, but on a given day the German carrier issues 10,000 requests, this activity would exceed the threshold of normal authentication behavior. The threshold can change over time to accommodate new normal authentication behavior.

From operation 304, the method 300 proceeds to operation 306, where the behavior-based SS7 filter 120 stores the message(s) screened from the SS7 traffic 122 at operation 304. The behavior-based SS7 filter 120 can store the screened messages in the behavior database 124.

From operation 306, the method 300 proceeds to operation 308, where the behavior-based SS7 filter 120 parses the screen message(s) stored in the behavior database 124 to identify one or more behavioral characteristics to be utilized to create one or more behavior profiles. Behavior characteristics may be inferred by (a) a provisioning table which outlines expected/normal behavior; (b) previous knowledge acquired by statistical analysis; (c) knowledge acquired from external sources; (d) some combination of (a), (b), and/or (c). An example would be a behavior filter that keeps track of these requests and stores this information in a repository for statistical reference. Another example would be a service provided by an external provider which would outline what constitutes normal behavior.

From operation 308, the method 300 proceeds to operation 310, where the behavior-based SS7 filter 120 creates, based upon the behavioral characteristics identified at operation 308, one or more behavior profiles. From operation 310, the method 300 proceeds to operation 312, where the behavior-based SS7 filter 120 stores the behavior profile(s) in the behavior database for future reference.

From operation 312, the method 300 proceeds to operation 314. The method 300 ends at operation 314.

Figure 4:
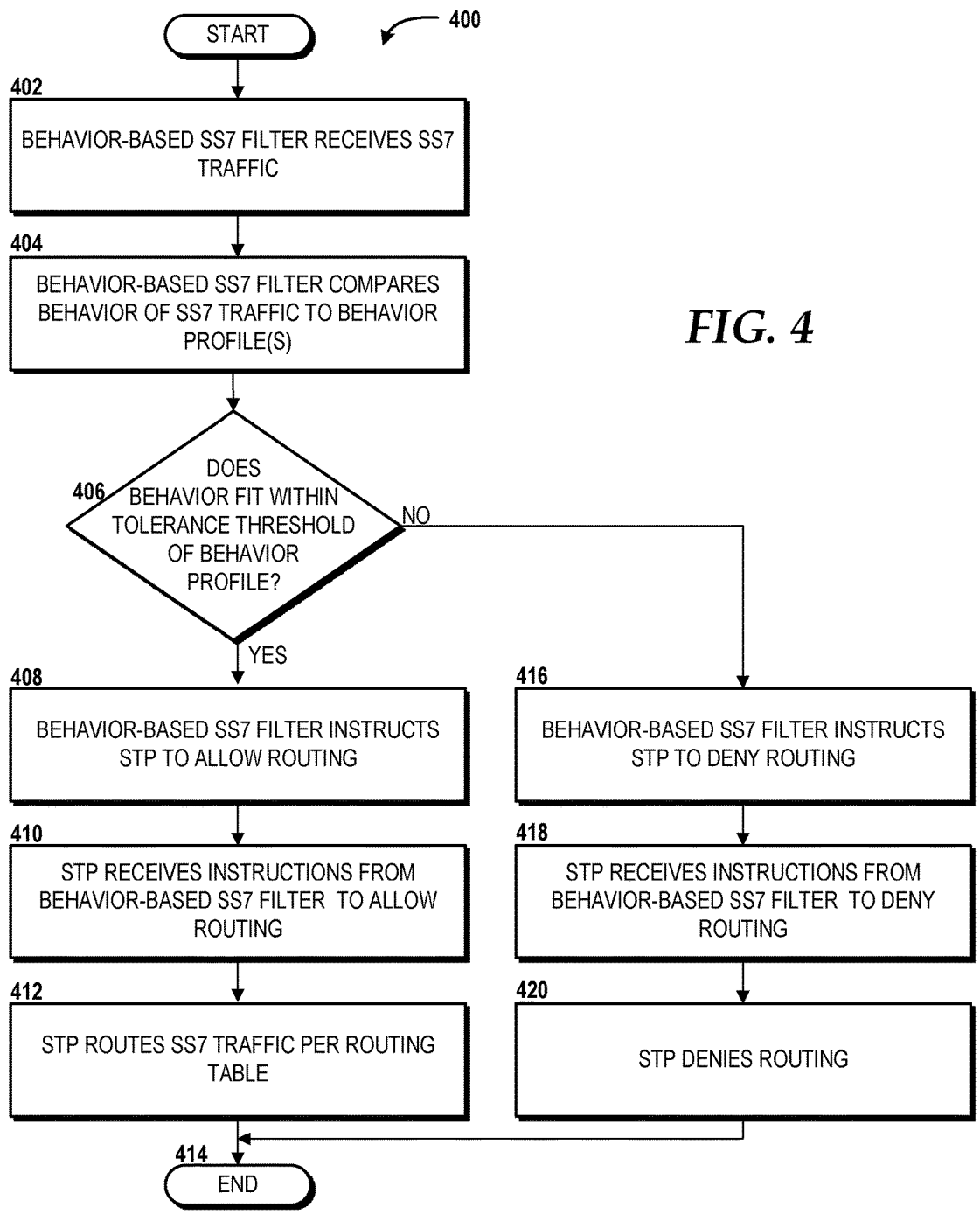
FIG. 4 is a flow diagram illustrating aspects of another method for behavior-based filtering of SS7 traffic, according to an illustrative embodiment.

Turning now to FIG. 4, a flow diagram illustrating aspects of another method 400 for behavior-based filtering of SS7 traffic will be described, according to an illustrative embodiment. For purposes of illustrating and describing some of the concepts of the present disclosure, the method 400 is described as being performed, at least in part, by the behavior-based SS7 filter 120 implemented in the STP-FEP 118, such as in the embodiment illustrated in FIG. 1, or by the behavior-based SS7 filter 120 implemented in the VNF 204, such as in the embodiment illustrated in FIG. 2. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 400 begins and proceeds to operation 402, where the behavior-based SS7 filter 120 receives SS7 traffic 122. From operation 402, the method 400 proceeds to operation 404, where the behavior-based SS7 filter 120 compares the behavior of the SS7 traffic 122, based upon behavioral characteristics of the SS7 traffic 122, to the behavior profile(s) stored in the behavior database 124.

From operation 404, the method 400 proceeds to operation 406, where the behavior-based SS7 filter 120 determines whether the behavior of the SS7 traffic 122 fits within a tolerance threshold of a behavior profile. If the SS7 traffic 122 fits within the tolerance threshold of the behavior profile, the method 400 proceeds to operation 408, where the behavior-based SS7 filter 120 instructs the STP 114 to which the SS7 traffic 122 is directed to allow routing of the SS7 traffic 122.

From operation 408, the method 400 proceeds to operation 410, where the STP 114 receives the instructions from the behavior-based SS7 filter 120 to allow routing of the SS7 traffic 122. From operation 410, the method 400 proceeds to operation 412, where the STP 114 routes the SS7 traffic 122 per routing table. From operation 412, the method 400 proceeds to operation 414. The method 400 ends at operation 414.

If, at operation 406, the behavior-based SS7 filter 120 instead determines that the behavior of the SS7 traffic 122 does not fit within the tolerance threshold of the behavior profile, the method 400 proceeds to operation 416, where the behavior-based SS7 filter 120 instructs the STP 114 to which the SS7 traffic 122 is directed to deny routing of the SS7 traffic 122.

From operation 416, the method 400 proceeds to operation 418, where the STP 114 receives the instructions from the behavior-based SS7 filter 120 to deny routing of the SS7 traffic 122. From operation 418, the method 400 proceeds to operation 420, where the STP 114 denies routing of the SS7 traffic 122. From operation 420, the method 400 proceeds to operation 414. The method 400 ends at operation 414.

Figure 5:
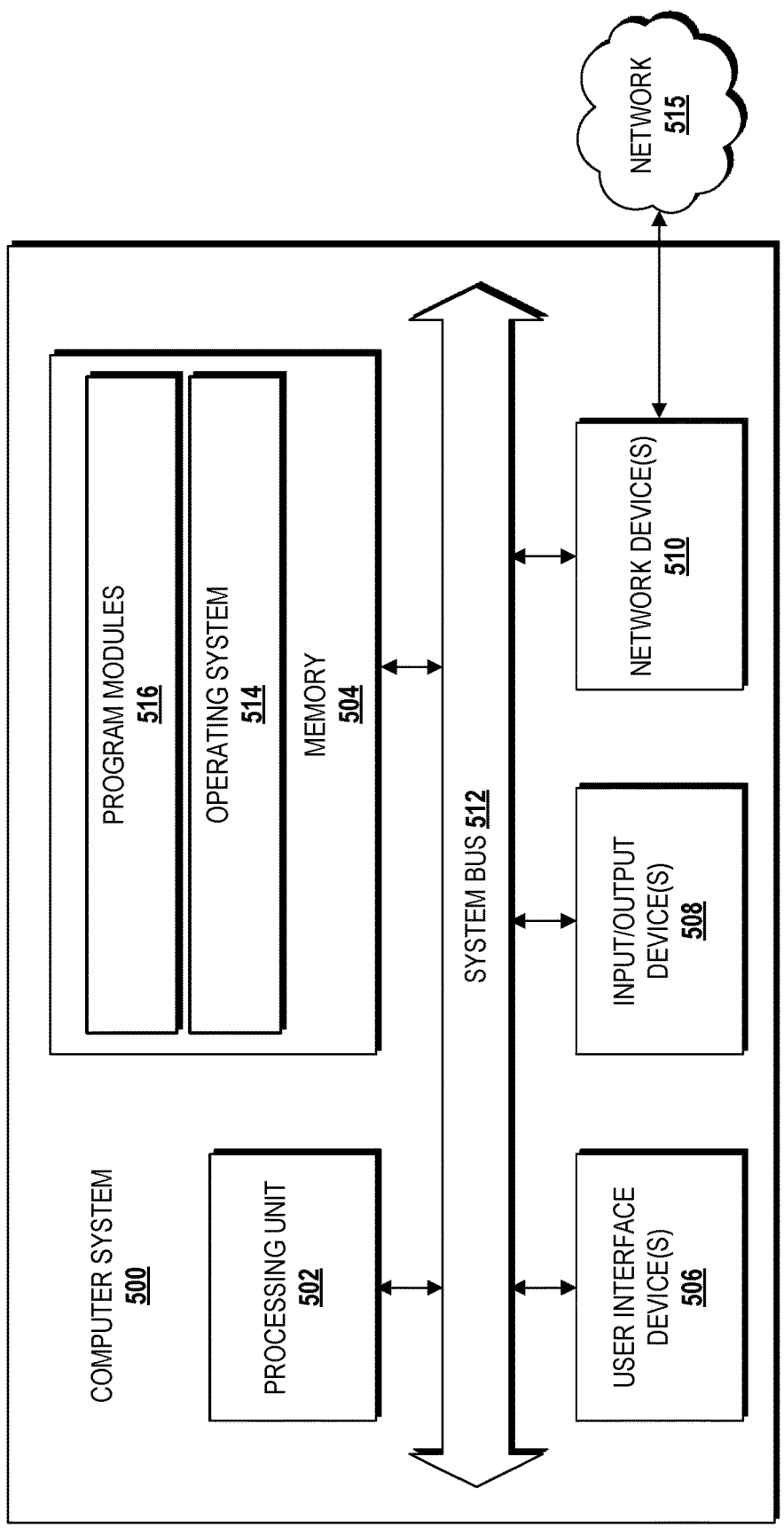
FIG. 5 is a block diagram illustrating an example computer system, according to an illustrative embodiment.

Turning now to FIG. 5 is a block diagram illustrating a computer system 500 configured to provide the functionality in accordance with various embodiments of the concepts and technologies disclosed herein. The systems, devices, and other components disclosed herein can utilize, at least in part, an architecture that is the same as or at least similar to the architecture of the computer system 500. It should be understood, however, that modification to the architecture may be made to facilitate certain interactions among elements described herein.

The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 504 communicates with the processing unit 502 via the system bus 512. In some embodiments, the memory 504 is operatively connected to a memory controller (not shown) that enables communication with the processing unit 502 via the system bus 512. The illustrated memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 516 may include various software and/or program modules to perform the various operations described herein. The program modules 516 and/or other programs can be embodied in computer-readable media containing instructions that, when executed by the processing unit 502, perform various operations such as those described herein. According to embodiments, the program modules 516 may be embodied in hardware, software, firmware, or any combination thereof.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, PDAs, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer. In some embodiments, the I/O devices 508 can be used for manual controls for operations to exercise under certain emergency situations.

The network devices 510 enable the computer system 500 to communicate with other networks or remote systems via a network 515. Examples of the network devices 510 include, but are not limited to, a modem, a radio frequency ("RF") or infrared ("IR") transceiver, a telephonic interface, a bridge, a router, or a network card. The network 515 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 515 may be or may include a wired network such as, but not limited to, a Wide Area Network ("WAN"), a wired Personal Area Network ("PAN"), or a wired Metropolitan Area Network ("MAN"). The network 515 can be or can include the RAN 104, the EPC network 108, the other network(s) 110, the SS7 network 112, and/or the SDN 202.

Figure 6:
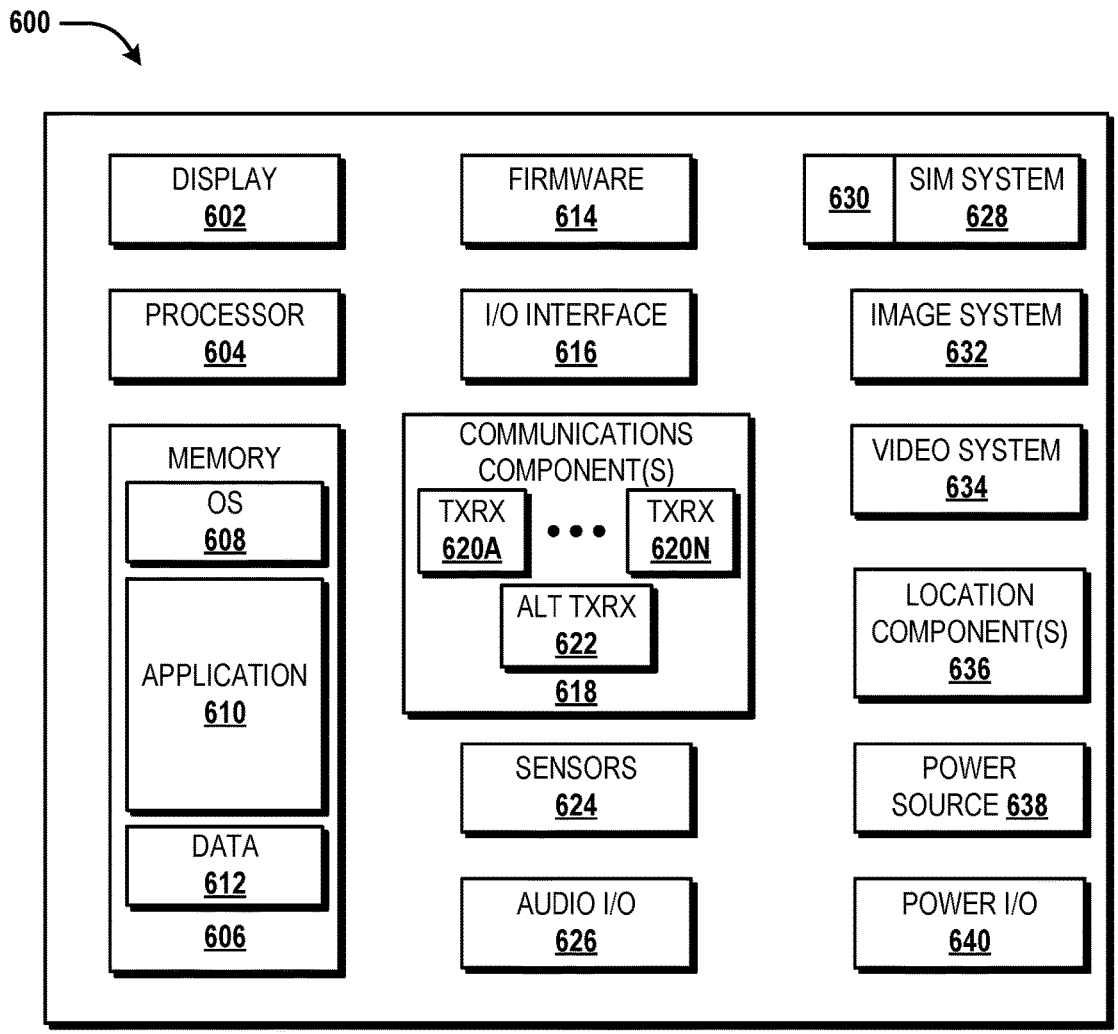
FIG. 6 is a block diagram illustrating an example mobile device, according to an illustrative embodiment.

Turning now to FIG. 6, a block diagram illustrating an example mobile device 600, according to an illustrative embodiment. In some embodiments, one or more of the UEs 102 (shown in FIGS. 1 and 2) can be configured like the mobile device 600. While connections are not shown between the various components illustrated in FIG. 6, it should be understood that some, none, or all of the components illustrated in FIG. 6 can be configured to interact with one another to carry out various device functions. In some embodiments, the components are arranged so as to communicate via one or more busses (not shown). Thus, it should be understood that FIG. 6 and the following description are intended to provide a general understanding of a suitable environment in which various aspects of embodiments can be implemented, and should not be construed as being limiting in any way.

As illustrated in FIG. 6, the mobile device 600 can include a display 602 for displaying data. According to various embodiments, the display 602 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 600 also can include a processor 604 and a memory or other data storage device ("memory") 606. The processor 604 can be configured to process data and/or can execute computer-executable instructions stored in the memory 606. The computer-executable instructions executed by the processor 604 can include, for example, an operating system 608, one or more applications 610, other computer-executable instructions stored in a memory 606, or the like. In some embodiments, the applications 610 also can include a user interface ("UI") application (not illustrated in FIG. 6).

The UI application can interface with the operating system 608 to facilitate user interaction with functionality and/or data stored at the mobile device 600 and/or stored elsewhere. In some embodiments, the operating system 608 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 604 to aid a user in entering content, viewing account information, answering/initiating calls, entering/deleting data, entering and setting user IDs and passwords for device access, configuring settings, manipulating address book content and/or settings, multimode interaction, interacting with other applications 610, and otherwise facilitating user interaction with the operating system 608, the applications 610, and/or other types or instances of data 612 that can be stored at the mobile device 600. The data 612 can include, for example, one or more identifiers, and/or other applications or program modules. According to various embodiments, the data 612 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 610, the data 612, and/or portions thereof can be stored in the memory 606 and/or in a firmware 614, and can be executed by the processor 604. The firmware 614 also can store code for execution during device power up and power down operations. It can be appreciated that the firmware 614 can be stored in a volatile or non-volatile data storage device including, but not limited to, the memory 606 and/or a portion thereof.

The mobile device 600 also can include an input/output ("I/O") interface 616. The I/O interface 616 can be configured to support the input/output of data such as location information, user information, organization information, presence status information, user IDs, passwords, and application initiation (start-up) requests. In some embodiments, the I/O interface 616 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ10 port, a proprietary port, combinations thereof, or the like. In some embodiments, the mobile device 600 can be configured to synchronize with another device to transfer content to and/or from the mobile device 600. In some embodiments, the mobile device 600 can be configured to receive updates to one or more of the applications 610 via the I/O interface 616, though this is not necessarily the case. In some embodiments, the I/O interface 616 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 616 may be used for communications between the mobile device 600 and a network device or local device.

The mobile device 600 also can include a communications component 618. The communications component 618 can be configured to interface with the processor 608 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 618 includes a multimode communications subsystem for facilitating communications via the cellular network and one or more other networks.

The communications component 618, in some embodiments, includes one or more transceivers. The one or more transceivers, if included, can be configured to communicate over the same and/or different wireless technology standards with respect to one another. For example, in some embodiments one or more of the transceivers of the communications component 618 may be configured to communicate using GSM, CDMA ONE, CDMA2000, LTE, and various other 2G, 2.5G, 3G, 4G, and greater generation technology standards. Moreover, the communications component 618 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 618 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 618 can include a first transceiver ("TxRx") 620A that can operate in a first communications mode (e.g., GSM). The communications component 618 also can include an $N^{th}$ transceiver ("TxRx") 620N that can operate in a second communications mode relative to the first transceiver 620A (e.g., UMTS). While two transceivers 620A-620N (hereinafter collectively and/or generically referred to as "transceivers 620") are shown in FIG. 6, it should be appreciated that less than two, two, and/or more than two transceivers 620 can be included in the communications component 618.

The communications component 618 also can include an alternative transceiver ("Alt TxRx") 622 for supporting other types and/or standards of communications. According to various contemplated embodiments, the alternative transceiver 622 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 618 also can facilitate reception from terrestrial radio networks, digital satellite radio networks, internet-based radio service networks, combinations thereof, and the like. The communications component 618 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 600 also can include one or more sensors 624. The sensors 624 can include temperature sensors, light sensors, air quality sensors, movement sensors, orientation sensors, noise sensors, proximity sensors, or the like. As such, it should be understood that the sensors 624 can include, but are not limited to, accelerometers, magnetometers, gyroscopes, infrared sensors, noise sensors, microphones, combinations thereof, or the like. Additionally, audio capabilities for the mobile device 600 may be provided by an audio I/O component 626. The audio I/O component 626 of the mobile device 600 can include one or more speakers for the output of audio signals, one or more microphones for the collection and/or input of audio signals, and/or other audio input and/or output devices.

The illustrated mobile device 600 also can include a subscriber identity module ("SIM") system 628. The SIM system 628 can include a universal SIM ("USIM"), a universal integrated circuit card ("UICC") and/or other identity devices. The SIM system 628 can include and/or can be connected to or inserted into an interface such as a slot interface 630. In some embodiments, the slot interface 630 can be configured to accept insertion of other identity cards or modules for accessing various types of networks. Additionally, or alternatively, the slot interface 630 can be configured to accept multiple subscriber identity cards. Because other devices and/or modules for identifying users and/or the mobile device 600 are contemplated, it should be understood that these embodiments are illustrative, and should not be construed as being limiting in any way.

The mobile device 600 also can include an image capture and processing system 632 ("image system"). The image system 632 can be configured to capture or otherwise obtain photos, videos, and/or other visual information. As such, the image system 632 can include cameras, lenses, charge-coupled devices ("CCDs"), combinations thereof, or the like. The mobile device 600 may also include a video system 634. The video system 634 can be configured to capture, process, record, modify, and/or store video content. Photos and videos obtained using the image system 632 and the video system 634, respectively, may be added as message content to an MMS message, email message, and sent to another mobile device. The video and/or photo content also can be shared with other devices via various types of data transfers via wired and/or wireless communication devices as described herein.

The mobile device 600 also can include one or more location components 636. The location components 636 can be configured to send and/or receive signals to determine a geographic location of the mobile device 600. According to various embodiments, the location components 636 can send and/or receive signals from global positioning system ("GPS") devices, assisted GPS ("A-GPS") devices, WI-FI/WIMAX and/or cellular network triangulation data, combinations thereof, and the like. The location component 636 also can be configured to communicate with the communications component 618 to retrieve triangulation data for determining a location of the mobile device 600. In some embodiments, the location component 636 can interface with cellular network nodes, telephone lines, satellites, location transmitters and/or beacons, wireless network transmitters and receivers, combinations thereof, and the like. In some embodiments, the location component 636 can include and/or can communicate with one or more of the sensors 624 such as a compass, an accelerometer, and/or a gyroscope to determine the orientation of the mobile device 600. Using the location component 636, the mobile device 600 can generate and/or receive data to identify its geographic location, or to transmit data used by other devices to determine the location of the mobile device 600. The location component 636 may include multiple components for determining the location and/or orientation of the mobile device 600.

The illustrated mobile device 600 also can include a power source 638. The power source 638 can include one or more batteries, power supplies, power cells, and/or other power subsystems including alternating current ("AC") and/or direct current ("DC") power devices. The power source 638 also can interface with an external power system or charging equipment via a power I/O component 640. Because the mobile device 600 can include additional and/or alternative components, the above embodiment should be understood as being illustrative of one possible operating environment for various embodiments of the concepts and technologies described herein. The described embodiment of the mobile device 600 is illustrative, and should not be construed as being limiting in any way.

Figure 7:
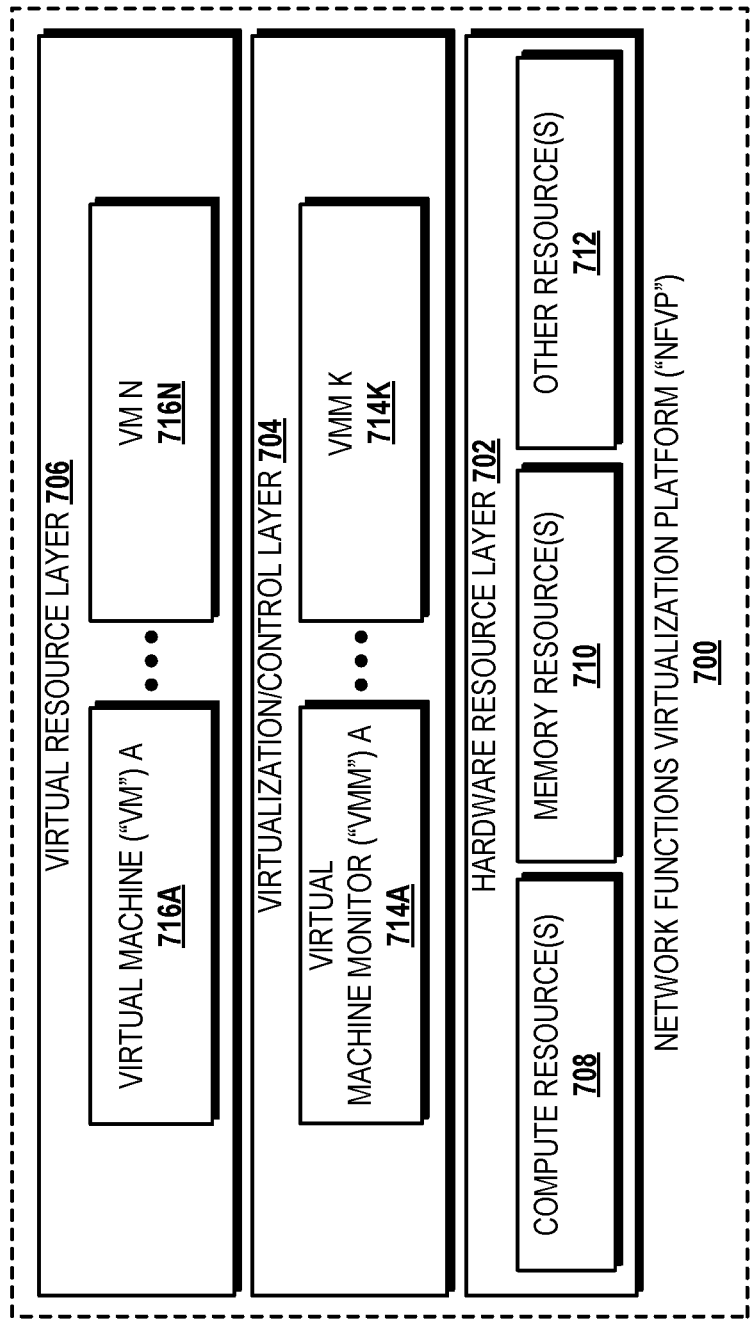
FIG. 7 is a block diagram illustrating an example network functions virtualization platform ("NFVP") capable of implementing aspects of the embodiments presented herein.

Turning now to FIG. 7, a NFVP 700 will be described, according to an exemplary embodiment. The architecture of the NVP 700 can be used to implement VNFs, such as the VNFs 204 disclosed herein. The NVP 700 is a shared infrastructure that can support multiple services and network applications. The illustrated NVP 700 includes a hardware resource layer 702, a virtualization/control layer 704, and a virtual resource layer 706 that work together to perform operations as will be described in detail herein.

The hardware resource layer 702 provides hardware resources, which, in the illustrated embodiment, include one or more compute resources 708, one or more memory resources 710, and one or more other resources 712. The compute resource(s) 708 can include one or more hardware components that perform computations to process data, and/or to execute computer-executable instructions of one or more application programs, operating systems, and/or other software. The compute resources 708 can include one or more central processing units ("CPUs") configured with one or more processing cores. The compute resources 708 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 708 can include one or more discrete GPUs. In some other embodiments, the compute resources 708 can include CPU and GPU components that are configured in accordance with a co-processing CPU/GPU computing model, wherein the sequential part of an application executes on the CPU and the computationally-intensive part is accelerated by the GPU. The compute resources 708 can include one or more system-on-chip ("SoC") components along with one or more other components, including, for example, one or more of the memory resources 710, and/or one or more of the other resources 712. In some embodiments, the compute resources 708 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 708 can be or can include one or more hardware components architected in accordance with an ARM architecture, available for license from ARM HOLDINGS of Cambridge, United Kingdom. Alternatively, the compute resources 708 can be or can include one or more hardware components architected in accordance with an x86 architecture, such an architecture available from INTEL CORPORATION of Mountain View, Calif., and others. Those skilled in the art will appreciate the implementation of the compute resources 708 can utilize various computation architectures, and as such, the compute resources 708 should not be construed as being limited to any particular computation architecture or combination of computation architectures, including those explicitly disclosed herein.

The memory resource(s) 710 can include one or more hardware components that perform storage operations, including temporary or permanent storage operations. In some embodiments, the memory resource(s) 710 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 708.

The other resource(s) 712 can include any other hardware resources that can be utilized by the compute resources(s) 708 and/or the memory resource(s) 710 to perform operations described herein. The other resource(s) 712 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resources layer 702 can be virtualized by one or more virtual machine monitors ("VMMs") 714A-714K (also known as "hypervisors"; hereinafter "VMMs 714") operating within the virtualization/control layer 704 to manage one or more virtual resources that reside in the virtual resource layer 706. The VMMs 714 can be or can include software, firmware, and/or hardware that alone or in combination with other software, firmware, and/or hardware, manages one or more virtual resources operating within the virtual resource layer 706.

The virtual resources operating within the virtual resource layer 706 can include abstractions of at least a portion of the compute resources 708, the memory resources 710, the other resources 712, or any combination thereof. These abstractions are referred to herein as virtual machines ("VMs"). In the illustrated embodiment, the virtual resource layer 706 includes VMs 716A-716N (hereinafter "VMs 716"). Each of the VMs 716 can execute one or more applications, such as, for example, the VNFs 204.

Figure 8:
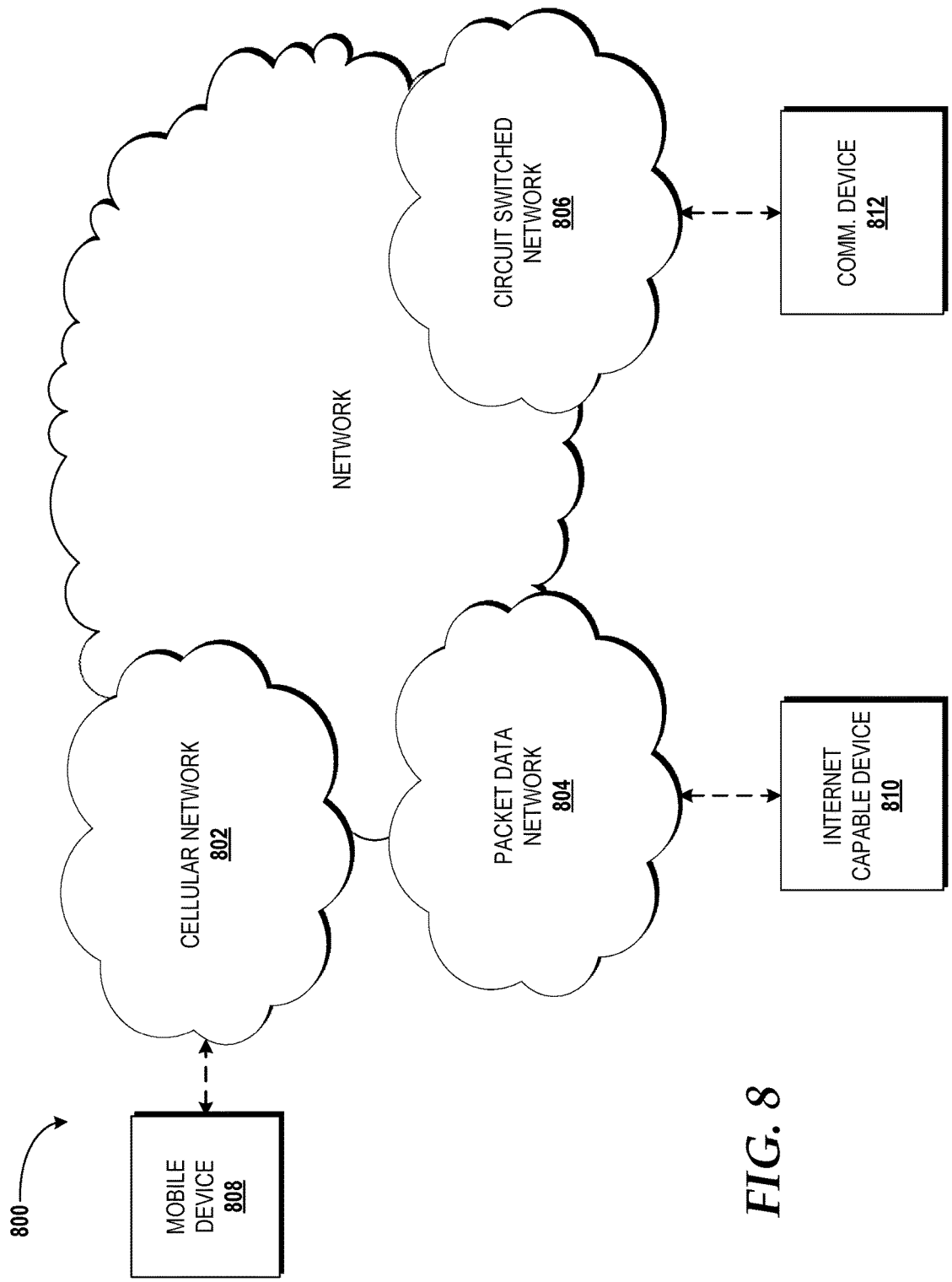
FIG. 8 schematically illustrates a network, according to an illustrative embodiment.

Turning now to FIG. 8, a schematic illustration of a network 800 will be described, according to an illustrative embodiment. The network 800 includes a cellular network 802, a packet data network 804, for example, the Internet, and a circuit switched network 806, for example, a publicly switched telephone network ("PSTN"). The cellular network 802 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HS Ss"), visitor location registers ("VLRs"), charging platforms, billing platforms, voicemail platforms, GPRS core network components, location service nodes, an IP Multimedia Subsystem ("IMS"), and the like. The cellular network 802 also includes radios and nodes for receiving and transmitting voice, data, and combinations thereof to and from radio transceivers, networks, the packet data network 804, and the circuit switched network 806.

A mobile communications device 808, such as, for example, a cellular telephone, a user equipment, a mobile terminal, a PDA, a laptop computer, a handheld computer, and combinations thereof, can be operatively connected to the cellular network 802. The cellular network 802 can be configured as a 2G GSM network and can provide data communications via GPRS and/or EDGE. Additionally, or alternatively, the cellular network 802 can be configured as a 3G UMTS network and can provide data communications via the HSPA protocol family, for example, HSDPA, EUL (also referred to as HSUPA), and HSPA+. The cellular network 802 also is compatible with 4G mobile communications standards as well as evolved and future mobile standards.

The packet data network 804 includes various devices, for example, servers, computers, databases, and other devices in communication with one another, as is generally known. The packet data network 804 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 804 includes or is in communication with the Internet. The circuit switched network 806 includes various hardware and software for providing circuit switched communications. The circuit switched network 806 may include, or may be, what is often referred to as a plain old telephone system ("POTS"). The functionality of a circuit switched network 806 or other circuit-switched network are generally known and will not be described herein in detail.

The illustrated cellular network 802 is shown in communication with the packet data network 804 and a circuit switched network 806, though it should be appreciated that this is not necessarily the case. One or more Internet-capable devices 810, for example, a PC, a laptop, a portable device, or another suitable device, can communicate with one or more cellular networks 802, and devices connected thereto, through the packet data network 804. It also should be appreciated that the Internet-capable device 810 can communicate with the packet data network 804 through the circuit switched network 806, the cellular network 802, and/or via other networks (not illustrated).

As illustrated, a communications device 812, for example, a telephone, facsimile machine, modem, computer, or the like, can be in communication with the circuit switched network 806, and therethrough to the packet data network 804 and/or the cellular network 802. It should be appreciated that the communications device 812 can be an Internet-capable device, and can be substantially similar to the Internet-capable device 810. In the specification, the network 800 is used to refer broadly to any combination of the networks 802, 804, 806. It should be appreciated that substantially all of the functionality described with reference to the network 800 can be performed by the cellular network 802, the packet data network 804, and/or the circuit switched network 806, alone or in combination with other networks, network elements, and the like. The network 800 can include the functionality of any of the networks described herein.

Based on the foregoing, it should be appreciated that concepts and technologies directed to behavior-based filters for SS7 networks have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

What is claimed is:

1. A method comprising:
   detecting, by a behavior-based signaling system number 7 ("SS7") filter executed by a processor of a behavior-based SS7 filter system, SS7 signaling traffic associated with an SS7 network;
   screening, by the behavior-based SS7 filter, the SS7 signaling traffic associated with the SS7 network;
   storing, by the behavior-based SS7 filter, the SS7 signaling traffic associated with the SS7 network;
   parsing, by the behavior-based SS7 filter, the SS7 signaling traffic associated with the SS7 network to generate parsed SS7 signaling traffic;
   creating, by the behavior-based SS7 filter, a behavior profile based upon a characteristic of the parsed SS7 signaling traffic; and
   storing, by the behavior-based SS7 filter, the behavior profile in a database.

2. The method of claim 1, wherein the behavior-based SS7 filter system comprises a signal transfer point front end processor.

3. The method of claim 1, wherein the behavior-based SS7 filter system comprises a virtual network function operating on a network functions virtualization platform, wherein the network functions virtualization platform comprises the processor.

4. The method of claim 1, wherein the SS7 signaling traffic comprises a transaction capabilities application part message.

5. The method of claim 4, wherein screening, by the behavior-based SS7 filter, the SS7 signaling traffic associated with the SS7 network comprises screening, by the behavior-based SS7 filter, the SS7 signaling traffic for the transaction capabilities application part message.

6. The method of claim of claim 1, wherein the behavior profile is associated with a tolerance threshold that identifies a maximum tolerance level to be utilized by the behavior-based SS7 filter to determine whether the SS7 signaling traffic fits the behavior profile.

7. A behavior-based signaling system number 7 ("SS7") filter system comprising:
   a processor; and
   memory that stores instructions that, when executed by the processor, causes the processor to perform operations comprising
      detecting SS7 signaling traffic associated with an SS7 network,
      screening the SS7 signaling traffic associated with the SS7 network,
      storing the SS7 signaling traffic associated with the SS7 network,
      parsing the SS7 signaling traffic associated with the SS7 network to generate parsed SS7 signaling traffic,
      creating a behavior profile based upon a characteristic of the parsed SS7 signaling traffic, and
      storing the behavior profile in a database.

8. The behavior-based SS7 filter system of claim 7, further comprising a signal transfer point front end processor that comprises the processor and the memory.

9. The behavior-based SS7 filter system of claim 7, further comprising a virtual network function operating on a network functions virtualization platform, wherein the network functions virtualization platform comprises the processor.

10. The behavior-based SS7 filter system of claim 7, wherein the SS7 signaling traffic comprises a transaction capabilities application part message.

11. The behavior-based SS7 filter system of claim 10, wherein screening the SS7 signaling traffic associated with the SS7 network comprises screening the SS7 signaling traffic for the transaction capabilities application part message.

12. The behavior-based SS7 filter system of claim 7, wherein the behavior profile is associated with a tolerance threshold that identifies a maximum tolerance level to be utilized by the behavior-based SS7 filter to determine whether the SS7 signaling traffic fits the behavior profile.

13. The behavior-based SS7 filter system of claim 7, wherein the characteristic is from a provisioning table that outlines an expected behavior.

14. The behavior-based SS7 filter system of claim 7, wherein the characteristic is from previous knowledge acquired by statistical analysis.

15. The behavior-based SS7 filter system of claim 7, wherein the characteristic is from knowledge acquired from an external source.

16. A computer-readable storage medium having instructions stored thereon that, when executed by a processor, cause the processor to perform operations comprising:
   detecting signaling system number 7 ("SS7") signaling traffic associated with an SS7 network;
   screening the SS7 signaling traffic associated with the SS7 network;
   storing the SS7 signaling traffic associated with the SS7 network;
   parsing the SS7 signaling traffic associated with the SS7 network to generate parsed SS7 signaling traffic;
   creating a behavior profile based upon a characteristic of the parsed SS7 signaling traffic; and
   storing the behavior profile in a database.

17. The computer-readable storage medium of claim 16, wherein the SS7 signaling traffic comprises a transaction capabilities application part message.

18. The computer-readable storage medium of claim 17, wherein screening the SS7 signaling traffic associated with the SS7 network comprises screening the SS7 signaling traffic for the transaction capabilities application part message.

19. The computer-readable storage medium of claim 16, wherein the behavior profile is associated with a tolerance threshold that identifies a maximum tolerance level to be utilized by the behavior-based SS7 filter to determine whether the SS7 signaling traffic fits the behavior profile.

20. The computer-readable storage medium of claim 16, wherein the characteristic is from:
   a provisioning table that outlines an expected behavior;
   previous knowledge acquired by statistical analysis; or
   knowledge acquired from an external source.

* * * * *